United States Patent
Van Wageningen et al.

(10) Patent No.: US 9,137,042 B2
(45) Date of Patent: Sep. 15, 2015

(54) CLUSTER COUPLER IN A TIME TRIGGERED NETWORK

(75) Inventors: Andries Van Wageningen, Wijlre (NL); Joern Ungermann, Aachen (DE)

(73) Assignee: NXP, B.V., Eindhoven (NL)

( * ) Notice: Subject to any disclaimer, the term of this patent is extended or adjusted under 35 U.S.C. 154(b) by 1337 days.

(21) Appl. No.: 12/440,364

(22) PCT Filed: Aug. 27, 2007

(86) PCT No.: PCT/IB2007/053415
§ 371 (c)(1),
(2), (4) Date: Mar. 6, 2009

(87) PCT Pub. No.: WO2008/029318
PCT Pub. Date: Mar. 13, 2008

(65) Prior Publication Data
US 2010/0034210 A1    Feb. 11, 2010

(30) Foreign Application Priority Data

Sep. 6, 2006 (EP) .................................. 06120218

(51) Int. Cl.
*H04L 12/46* (2006.01)
*H04L 12/44* (2006.01)
(Continued)

(52) U.S. Cl.
CPC ............ *H04L 12/4625* (2013.01); *H04L 12/44* (2013.01); *H04L 49/55* (2013.01); *H04L 12/403* (2013.01); *H04L 2012/40241* (2013.01)

(58) Field of Classification Search
CPC ...................................................... H04L 12/44
USPC .............. 370/395.4, 458, 464, 498, 542, 229, 370/230, 235, 407
See application file for complete search history.

(56) References Cited

U.S. PATENT DOCUMENTS 4,868,783 A * 9/1989 Anderson et al. ............. 710/104
5,073,982 A * 12/1991 Viola et al. ..................... 398/61
(Continued)

FOREIGN PATENT DOCUMENTS

EP      1052813 A    11/2000
GB      2404121 A    1/2005
(Continued)

OTHER PUBLICATIONS

Berwanger, Josef, et al: "Flex-Ray—A Communication System for Advanced Automotive Control Systems"; SAE 2001 World Congress; Detroit, Michigan, US; Mar. 5-8, 2001.
(Continued)

*Primary Examiner* — Anh-Vu Ly
*Assistant Examiner* — Ashil Farahmand

(57) ABSTRACT

The invention relates to a cluster coupler in a time triggered network for connecting clusters operating on the same protocol. Further, it relates to a triggered network having a plurality of clusters, which are coupled via the cluster coupler. It also relates to a method for communicating between different clusters. To provide a cluster coupling means, a network and a method for communicating between clusters which are able to couple a plurality of clusters operating on the same time triggered protocol to achieve a selectively forwarding of data without message buffering or frame delay a cluster cluster (10) in a network is proposed operating on a time triggered protocol using time slots, wherein the cluster coupler (10) is coupled to at least two clusters (A, B, X), a cluster includes at least one node (11), wherein the same protocol is used within the clusters, the cluster coupler (10) comprises: a protocol engine (12), a switch (20) and a switch control unit (21), wherein the switch control unit (21) includes an interconnection schedule indicating which input port of the switch (20) is connected to which output port of the switch (20) at a predetermined time slot.

20 Claims, 12 Drawing Sheets

Figure 1A:
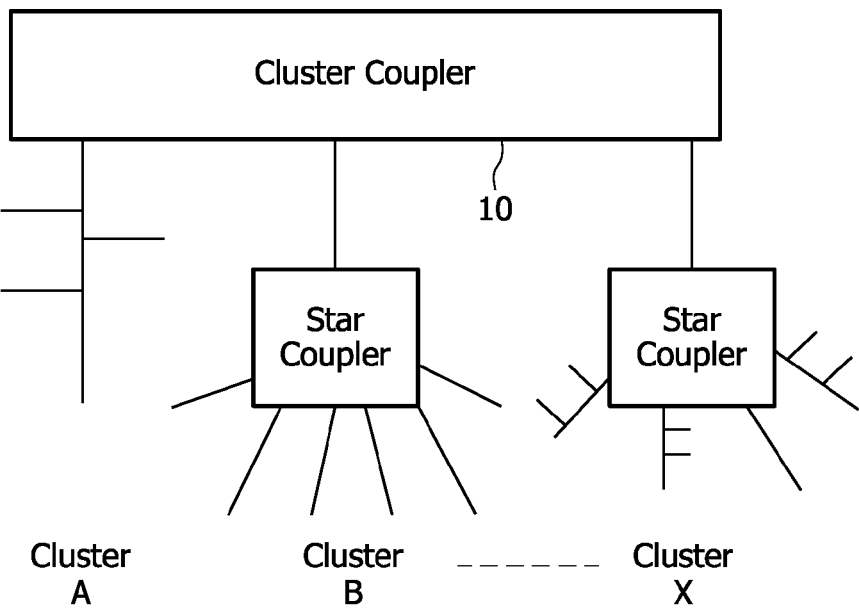

(51) Int. Cl.
*H04L 12/939* (2013.01)
*H04L 12/403* (2006.01)
*H04L 12/40* (2006.01)

(56) References Cited

U.S. PATENT DOCUMENTS

| | | | |
|---|---|---|---|
| 5,166,674 A * | 11/1992 | Baum et al. | 714/752 |
| 6,034,960 A * | 3/2000 | Beshai et al. | 370/395.4 |
| 6,778,536 B1 * | 8/2004 | Ofek et al. | 370/395.4 |
| 7,733,841 B2 * | 6/2010 | Jordan et al. | 370/349 |
| 2002/0150121 A1 | 10/2002 | Van Wageningen et al. | |
| 2004/0019777 A1 * | 1/2004 | Wygant | 713/1 |
| 2005/0122508 A1 | 6/2005 | Uto et al. | |
| 2005/0135277 A1 * | 6/2005 | Hall et al. | 370/258 |
| 2006/0045135 A1 | 3/2006 | Hetzel et al. | |
| 2006/0083460 A1 * | 4/2006 | Tamil | 385/17 |
| 2006/0264177 A1 * | 11/2006 | Heidari-Bateni et al. | 455/62 |
| 2007/0140294 A1 | 6/2007 | Takatori | |
| 2009/0279540 A1 * | 11/2009 | Van Wageningen | 370/375 |
| 2010/0067404 A1 * | 3/2010 | Van Wageningen et al. | 370/254 |

FOREIGN PATENT DOCUMENTS

| | | |
|---|---|---|
| WO | 00/43857 A | 7/2000 |
| WO | 2005122508 A1 | 12/2005 |

OTHER PUBLICATIONS

Kopetz, H., et al; "A Synchronization Strategy for Time-Triggered Multicluster Real-Time System"; Reliable Distributed Systems, Bad Neuenahr; Sep. 13-15, 1995; New York, IEEE, US; Sep. 13, 1995; pp. 154-161; XP002293492; pp. 155, 159.

* cited by examiner

CLUSTER COUPLER IN A TIME TRIGGERED NETWORK

The invention relates to a cluster coupler in a time triggered network for connecting clusters operating on the same protocol. Further, it relates to a triggered network having a plurality of clusters, which are coupled via the cluster coupler. It also relates to a method for communicating between different clusters.

Dependable automotive communication networks rely on time triggered communication protocols like TTP/C or FlexRay, based on broadcast methods according to predetermined TDMA scheme. Time-triggered protocols are proposed for distributing real-time communication systems as used in, for example the automobile industry. Communication protocols of this kinds are described in "FlexRay—A Communication System for advanced automotive Control Systems" SEA World Congress 2001. In these systems, the media access protocol is based on a time triggered multiplex method, such as TDMA (Time Divisional Multiplex Access) with a static communication schedule, which is defined in advance during system design. This communication schedule defines for each communication node the times at which it may transmit data within a communication cycle.

Such network may include a plurality of different communication clusters. Each cluster includes at least one node. A plurality of nodes within a cluster may be interconnected by various topologies. Star couplers are normally applied to increase a number of nodes within a cluster, wherein gateways are used to interconnect the clusters. The separation of nodes into clusters or domains is a well-known solution to handle different application domains in parallel. That means, nodes or applications within the same cluster may communicate, wherein other applications running on nodes in other clusters may communicate in parallel. However, if a data exchange between applications running on different nodes within different clusters is required additional exchange of data between clusters will be necessary. Because existing domains have been evolved separately over time without a need for tight interaction, they are locally optimized and served with mostly different communication protocols. Therefore, current networks are highly heterogeneous and can only be connected by use of gateways serving different protocol stacks. The heterogeneous character of a network will result in hard limitations of inter domain communication in respect to the delay, jitter and fault tolerance.

A first solution to overcome this limitation due to the delay, jitter and fault tolerance maybe to use a single protocol, preferably one protocol meeting higher requirements, i.e. FlexRay protocol, which maybe applied for different clusters to realize a more homogeneous network and to thereby interconnect the clusters more tightly and offer a better end-to-end performance in respect to delay, jitter and fault tolerance. This will give the system designer more flexibility for system partitioning, because closely related functions running on different nodes do not necessarily have to be mapped to nodes allocated in the same cluster. This decreases the number of nodes within a cluster thereby reducing the required bandwidth and the probability of faults per cluster and improving the fault protection by separation of smaller application domains into more clusters.

Conventionally gateways are used for connecting clusters. In general, a gateway may add significant delay and jitter in the end-to-end data path, because it includes a communication protocol stack for each connected cluster. It also contributes to the probability of faults to the end-to-end path.

It is therefore an object of the present invention to provide a cluster coupling means, a network and a method for communicating between clusters which are able to couple a plurality of clusters operating on the same time triggered protocol to achieve a selectively forwarding of data without message buffering or frame delay.

The object is achieved by the features of the independent claims.

The inventive cluster coupler includes a switch having a plurality of input ports and output ports. Further, the cluster coupler includes a protocol engine. The switch is connected to the protocol engine and to the cluster ports in the cluster coupler. Further, there is a switch control unit, which receives synchronization data from the protocol engine and controls the switch, respectively. The switch control unit includes an interconnection schedule for the switch defining which input port of the switch is connected to which output port of the switch at a predetermined time slot. The protocol engine synchronizes the clusters at startup and during operation. A prerequisite for an inventive cluster coupler is that the connected clusters operate on the same time-triggered protocol using time slots. A further prerequisite is that the clusters need to be configured alike so that the cycle length and the time slot length and frame length are compatible to each other.

The invention is based on the thought to interconnect the clusters by use of the cluster coupler, wherein the interconnection which cluster is to be connected to another cluster is based on an interconnection schedule included in the switch control unit. The configuration of the switch is controlled on a time slot basis. Thus, by controlling the switch depending on synchronization information provided by the protocol engine and/or the interconnection schedule it is possible to intelligent connect the dataflow between clusters and between the protocol engine and clusters without providing any buffer means in the cluster coupler. The switch configuration maybe changed for each time slot. The invention applies a buffer-less switch connecting the clusters that is controlled by an interconnection schedule included in the switch control unit. The interconnection schedule is synchronized by only one protocol engine or a simplified version of it to the timing of the clusters, wherein the protocol engine is deriving that timing by monitoring the traffic of the clusters. Each cluster includes its own cluster schedule defining at which time slot which node may transmit. By synchronizing the clusters to each other by the protocol engine at startup and during operation it is possible to synchronize the cluster schedules of the connected clusters to the interconnection schedule of the switch control unit. The switch is used to synchronize the clusters to the protocol engine during and after startup.

Further, advantageous implementations and embodiments of the invention are set forth in the respective sub claims.

According to a preferred embodiment of the invention the protocol engine is integrated in the switch control unit.

A further aspect of the invention relates to the synchronization of the clusters. In time triggered networks it is very important to have a reliable synchronization between the clusters during startup and also during the normal operating. To provide this synchronization during startup the protocol engine in the cluster coupler takes the lead for synchronization. The protocol engine receives a startup signal or a stimulus from a the cluster coupler or a connected host application or from the communication controller. Then the protocol engine is initiating a synchronized startup of the connected cluster by providing a synchronization information to the switch control unit for controlling the switch in such a way that startup and synchronization data generated by the protocol engine and the responses of the nodes in the clusters are distributed to all cluster. That means the switch control unit is adapting the interconnection schedule of the switch control unit in that way, that the synchronization data from the protocol engine are provided at first to all clusters simultaneously. In each cluster there is a predetermined node responding to such synchronization data. The switch is further configured by the switch control unit such that the response data from the nodes in the clusters are simultaneously distributed to all clusters without any conflicts. A synchronization information is provided to the switch control unit only for informing the switch control unit that the protocol engine wants to sent startup or synchronization data in form of frames to the clusters. If the switch control unit receives such synchronization information it knows how the switch needs to be connected to provide at first the synchronization data from the protocol engine to all clusters simultaneously and at second how to connect the switch for distributing the response data of the nodes within the clusters to all clusters.

Further, it is possible that the switch control unit could also contain different switch configurations for the same slot in a cycle based on the cycle counter.

According to the invention the switch is forwarding data between connected clusters and the protocol engine and forwarding data between the clusters based on the interconnection schedule stored in the switch control unit. Thus, the switch control unit may monitor and configure the switch to avoid conflicts between data transmitted by nodes in different clusters. Therefore the switch control unit is acting like a bus guardian providing a protection against disturbing nodes and avoiding fault propagation. In case that a node is sending within a time slot not allowed for this node the switch control unit will connect the inputs and outputs of the switch only depending on its interconnection schedule and depending on the synchronization information received from the protocol engine.

To provide a proper switching of the input and output ports the ports are arranged in matrix form, wherein a configuration register is assigned to each output port for determining to which input port the output port is connected. By changing the configuration register the connection between input port and output port is changed. The configuration register is changed by the switch control unit, wherein to follow the synchronization between the clusters a change of the switch configuration is made effective according to a synchronization signal from the switch control unit or the protocol engine.

In a further embodiment of the invention the cluster coupler is prepared to handle a plurality of channels in the clusters. When a cluster comprises a plurality of channels, the inventive cluster coupler also includes a plurality of switches, wherein one switch is connected to one channel, each. Thus, it is achieved that different clusters are connected per channel in the same way. The multiple switches may be controlled by the same switch control unit and by only one protocol engine.

The object of the present invention is also solved by a network having a plurality of clusters, wherein each cluster includes a plurality of nodes, the clusters operate on the same time triggered protocol and are connected via a cluster coupler as mentioned above. Within such network it is advantageously to have a plurality of cluster couplers for redundancy reasons. Thus a single point of failure of the cluster coupler may be avoided. For maintaining the performance of the cluster coupler in case of a fault, the redundant cluster couplers needs to be connected to the same channel. This redundant solution maybe combined with the multiple channel solution as mentioned above. Thus, each switch of the multiple cluster couplers for a certain channel is coupled to the certain channel in each connected cluster.

The object is further solved by a method for communicating in a network between different clusters using a time triggered protocol on time slot basis, wherein the network includes a cluster coupler connected to at least two clusters, the cluster coupler includes a switch, a switch control unit and a protocol engine. The method comprises the following steps: providing synchronization between the connected clusters at start up and during operation by the protocol engine in the cluster coupler; providing a synchronization information to the switch control unit for configuring the switch on a global time slot base, wherein the switch control unit makes use of a switch interconnection schedule comprising a switch interconnection configuration for each time slot.

The invention provides the advantages that only one protocol is required for interconnecting the clusters and allowing an intercluster communication. Further, by using a preconfigured IP Block for this protocol engine the effort is reduced. Additionally a synchronized startup of the clusters is achieved. Due to the interconnection schedule of the switch control unit it is possible to connect single nodes at the cluster coupler. Thus the cluster coupler acts like a guardian providing the required protection and further acts like a star coupler for connecting single nodes to other clusters.

Figure 1B:
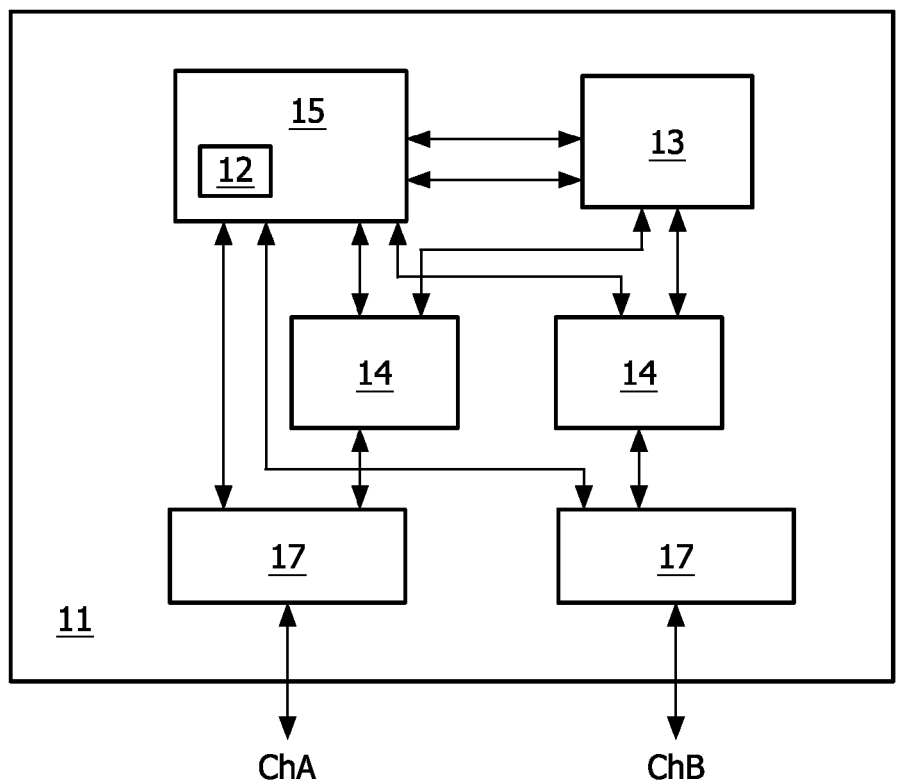
Figure 2:
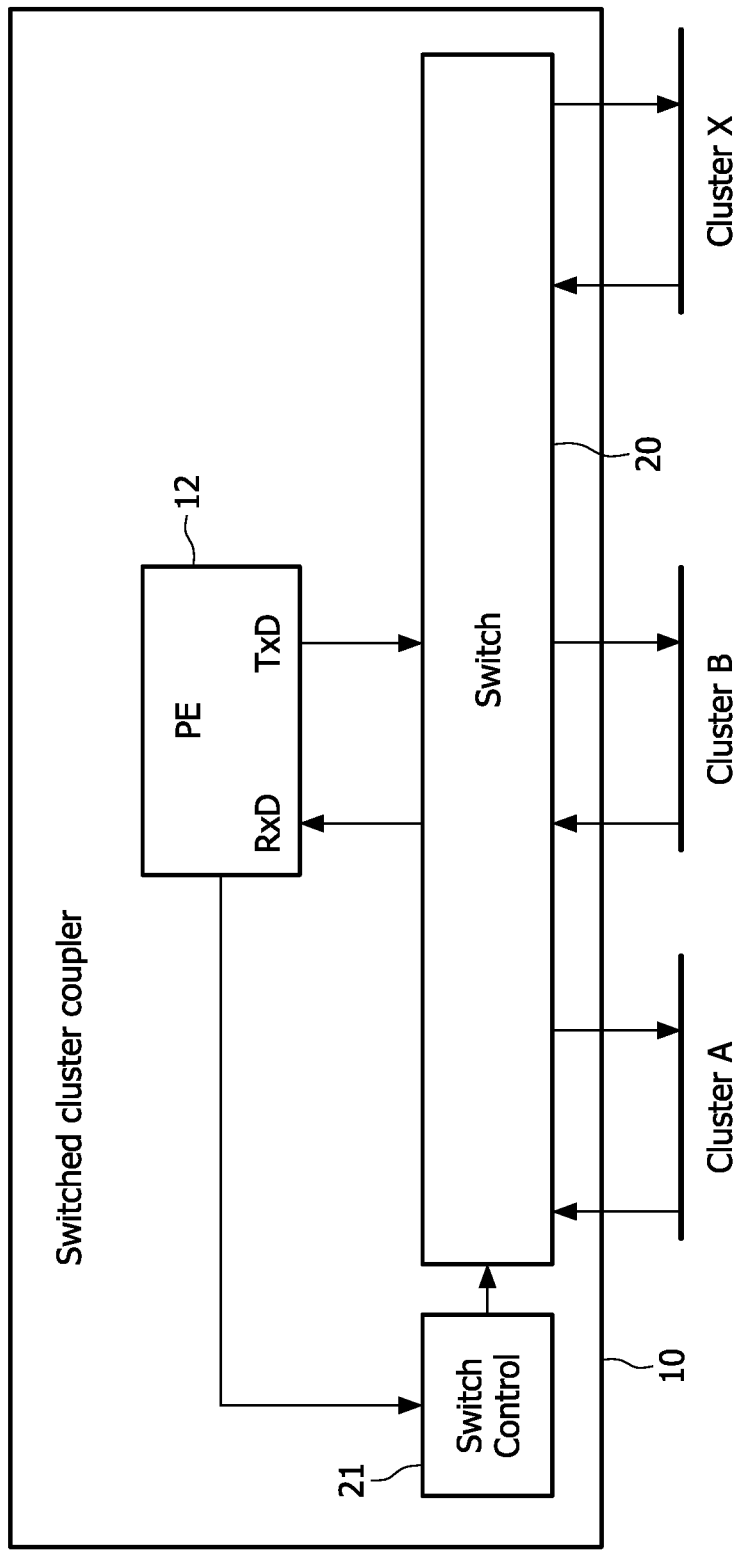
Figure 3:
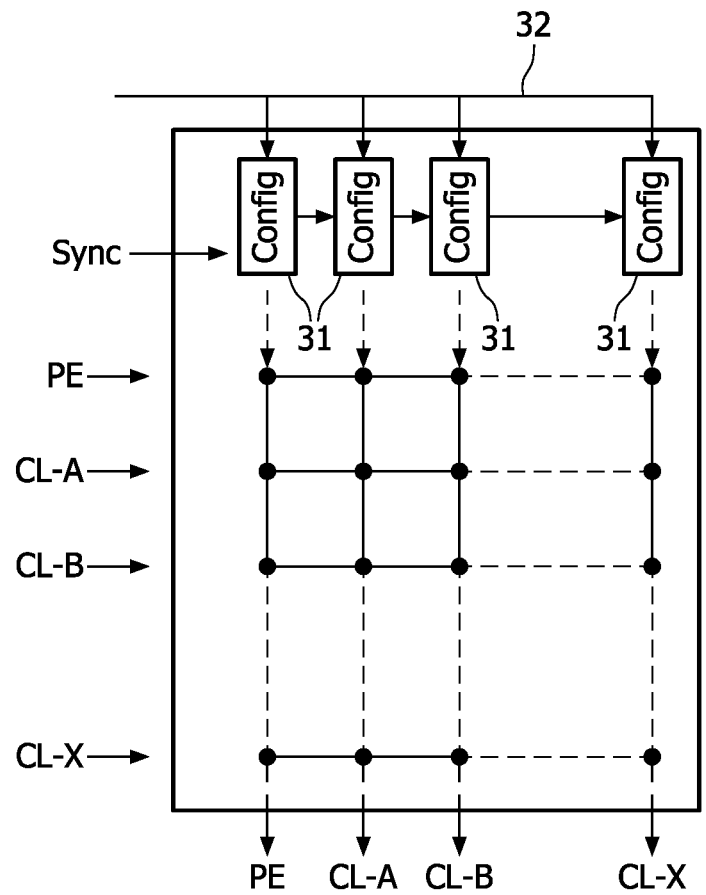
Figure 4A:
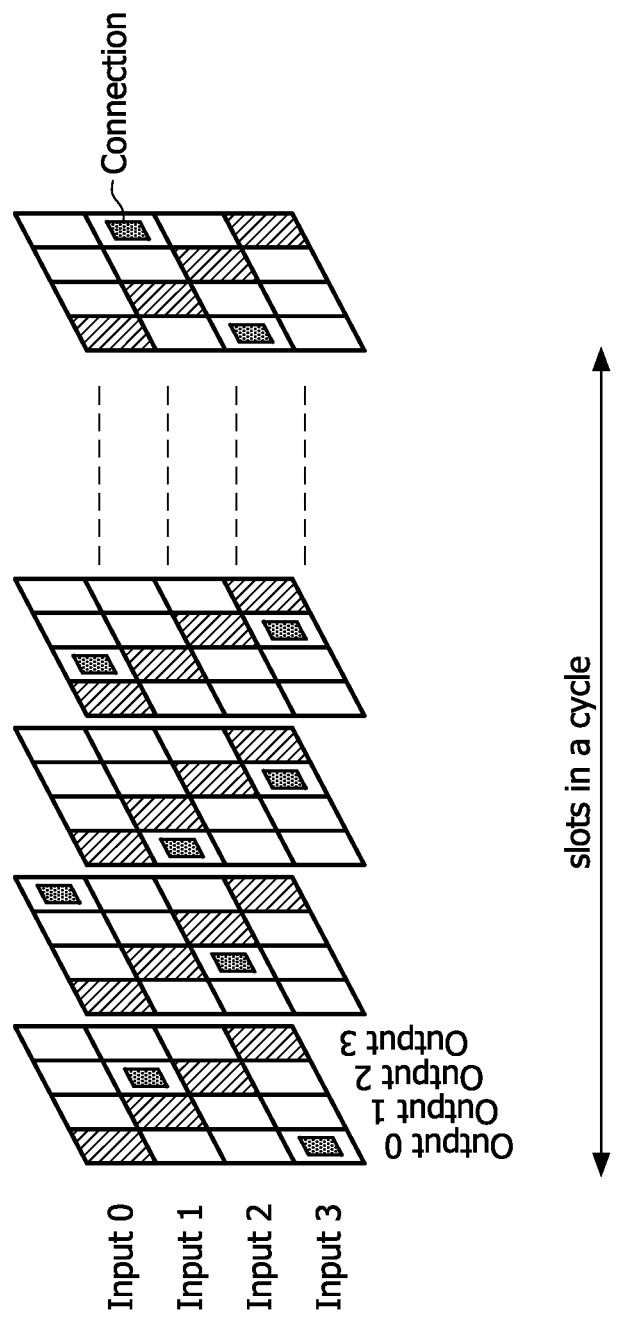
Figure 4B:
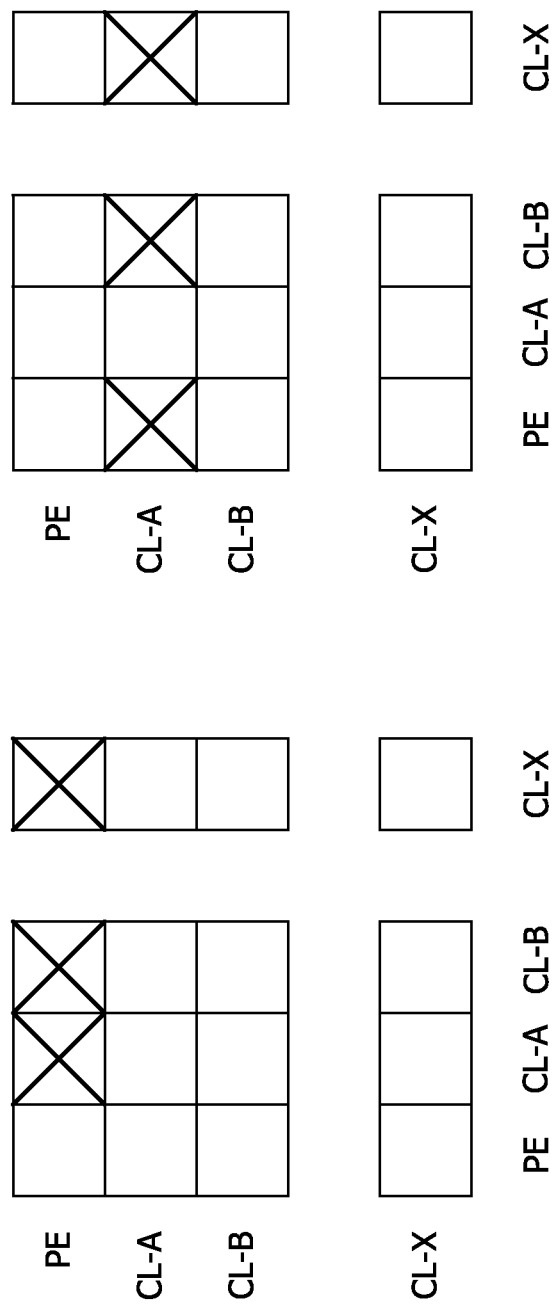
Figure 5:
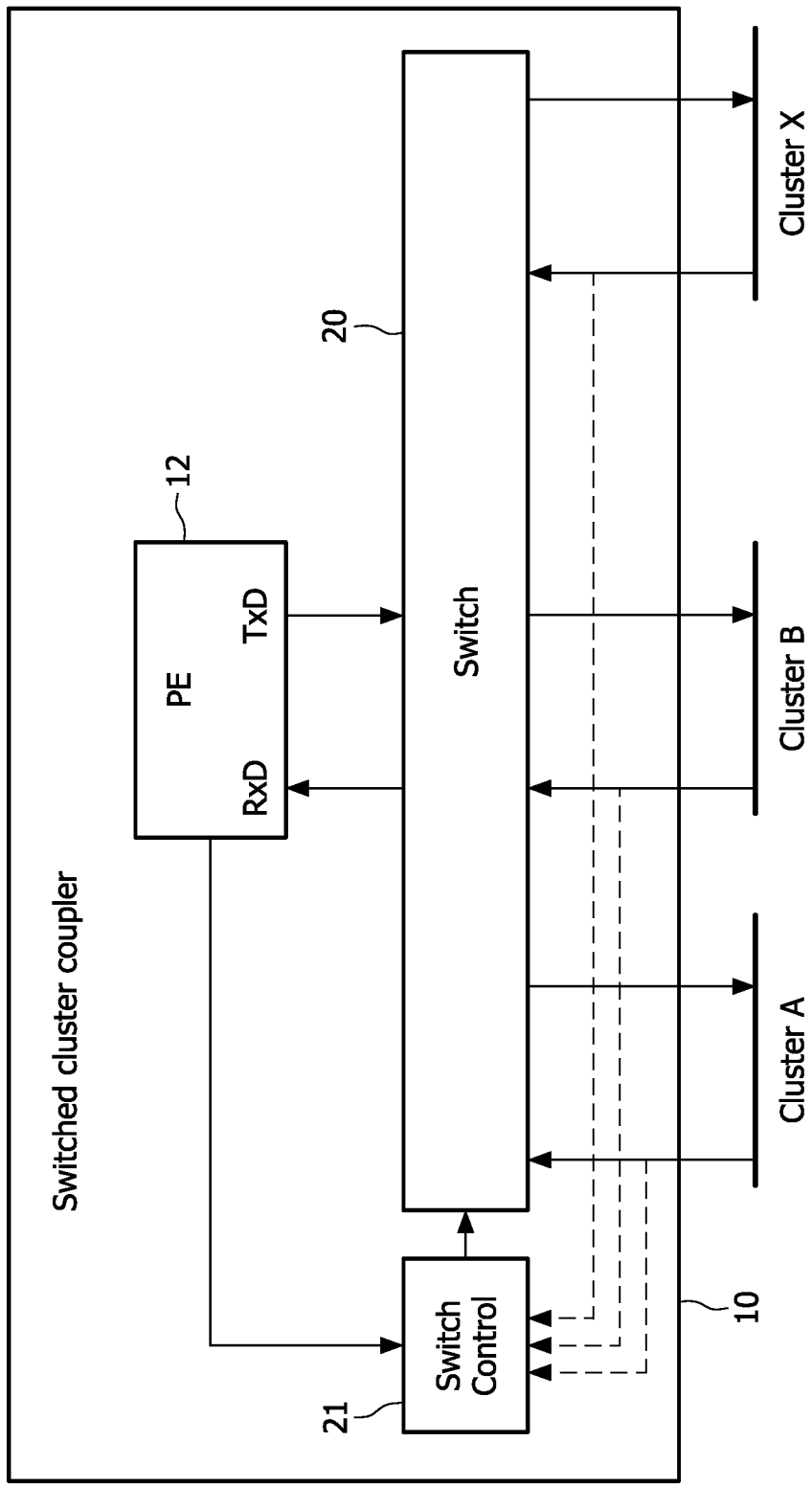
Figure 6:
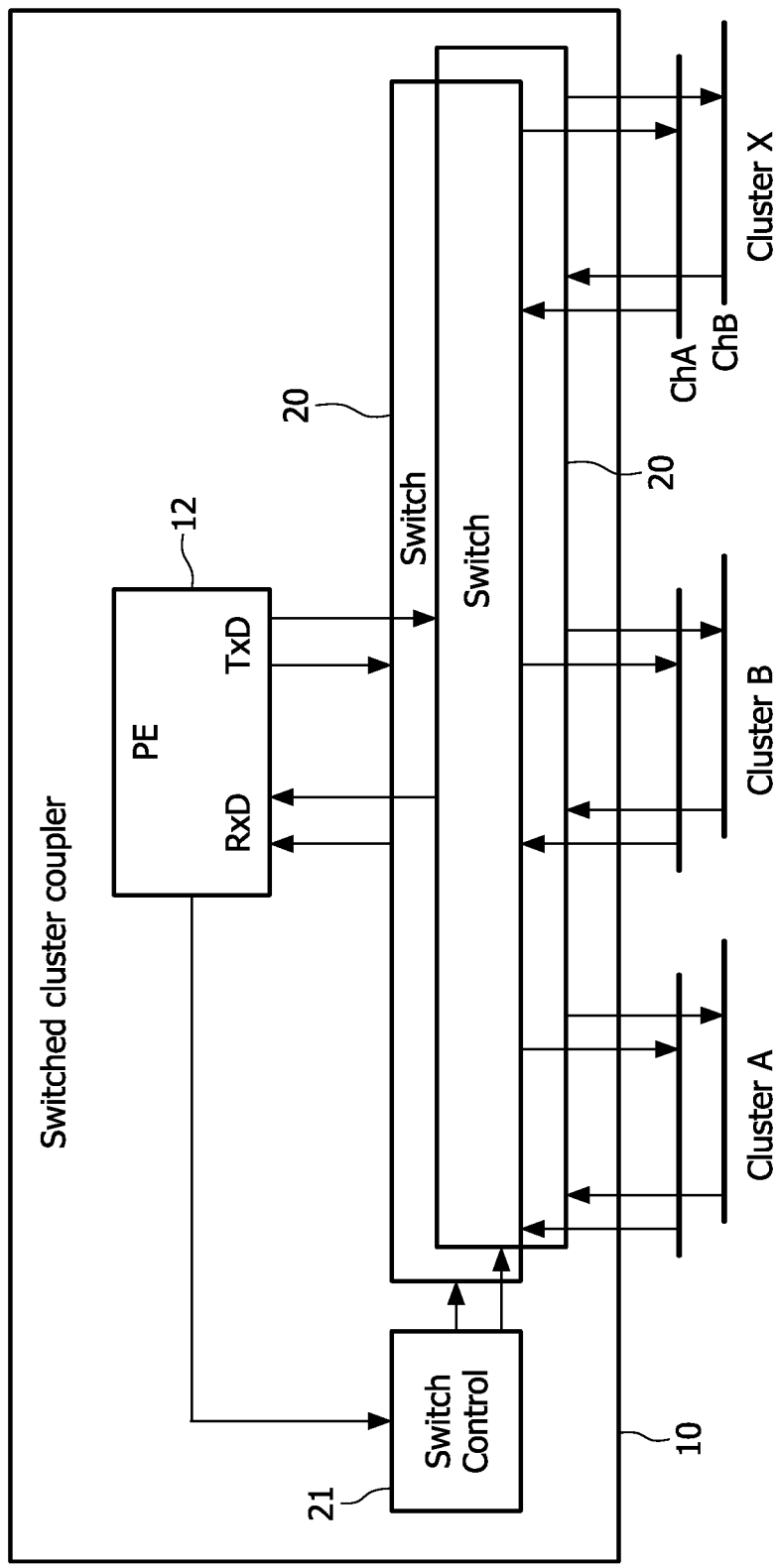
Figure 7:
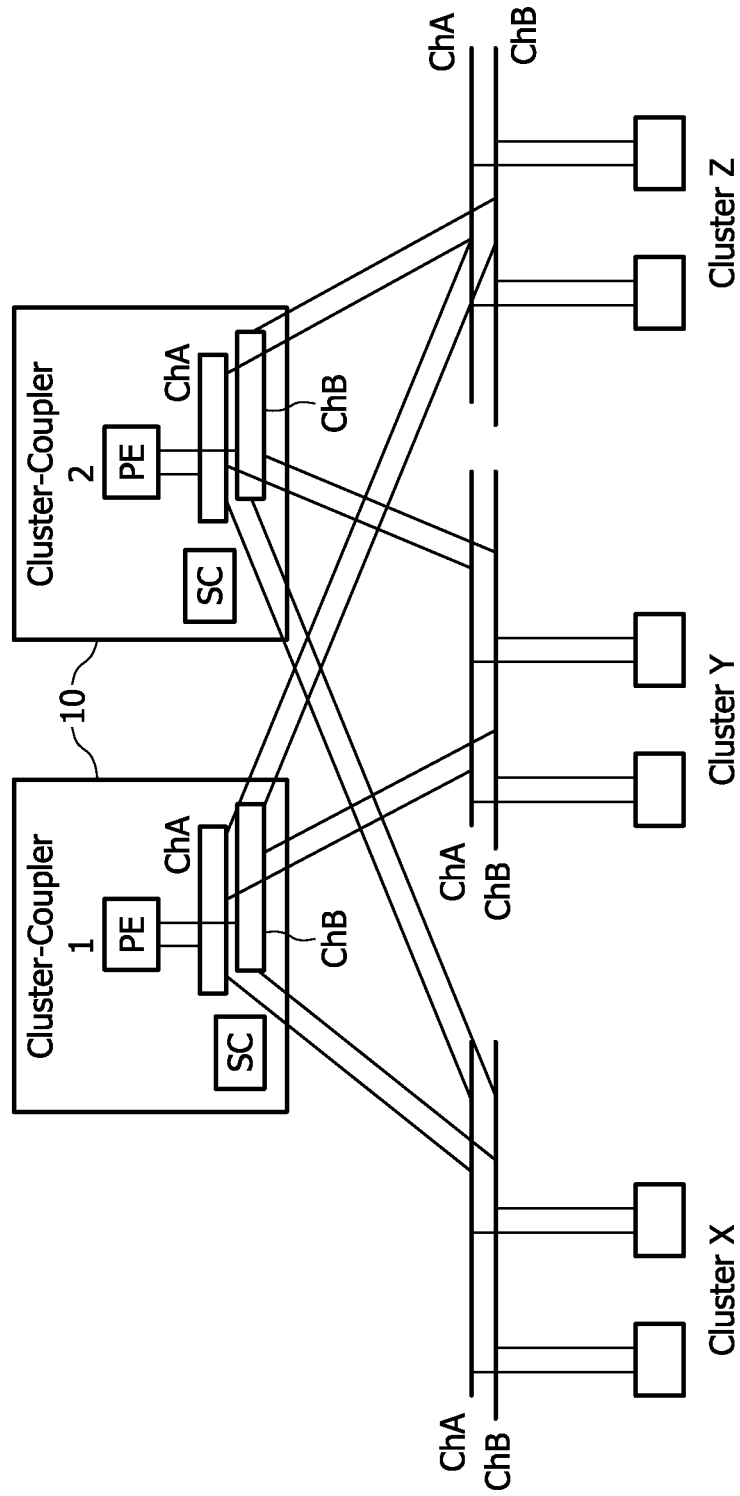
Figure 8:
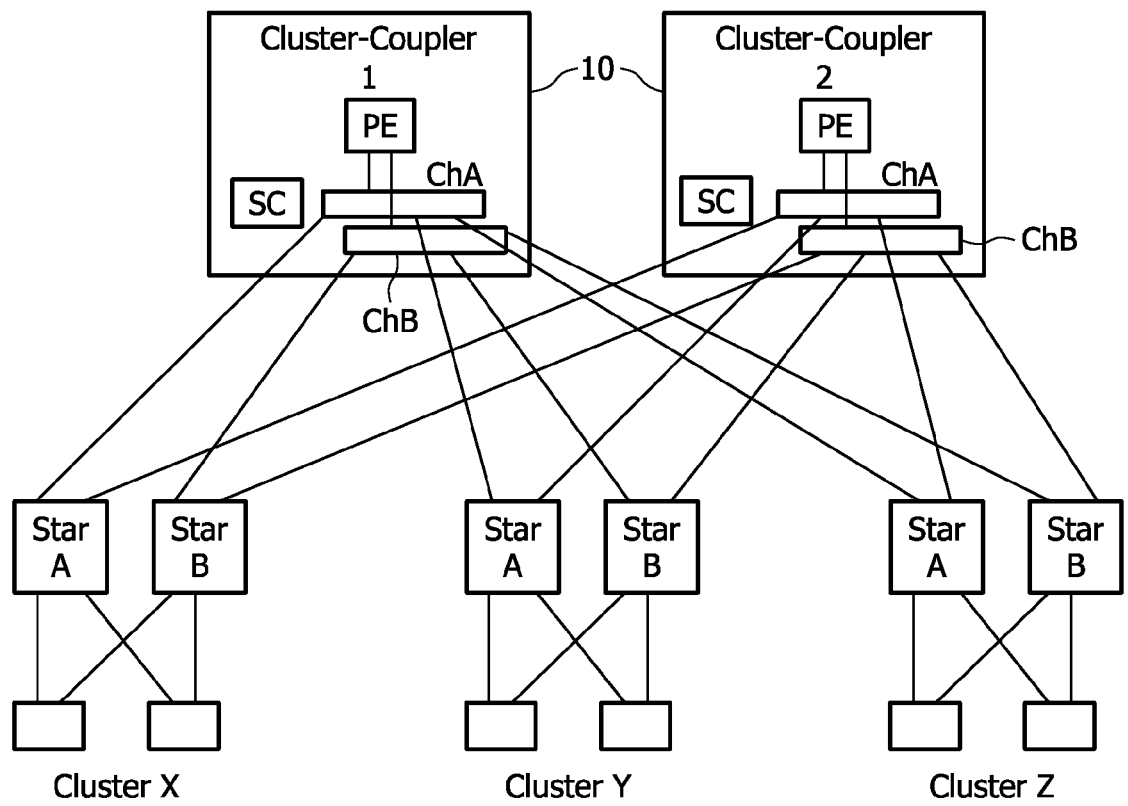
Figure 9:
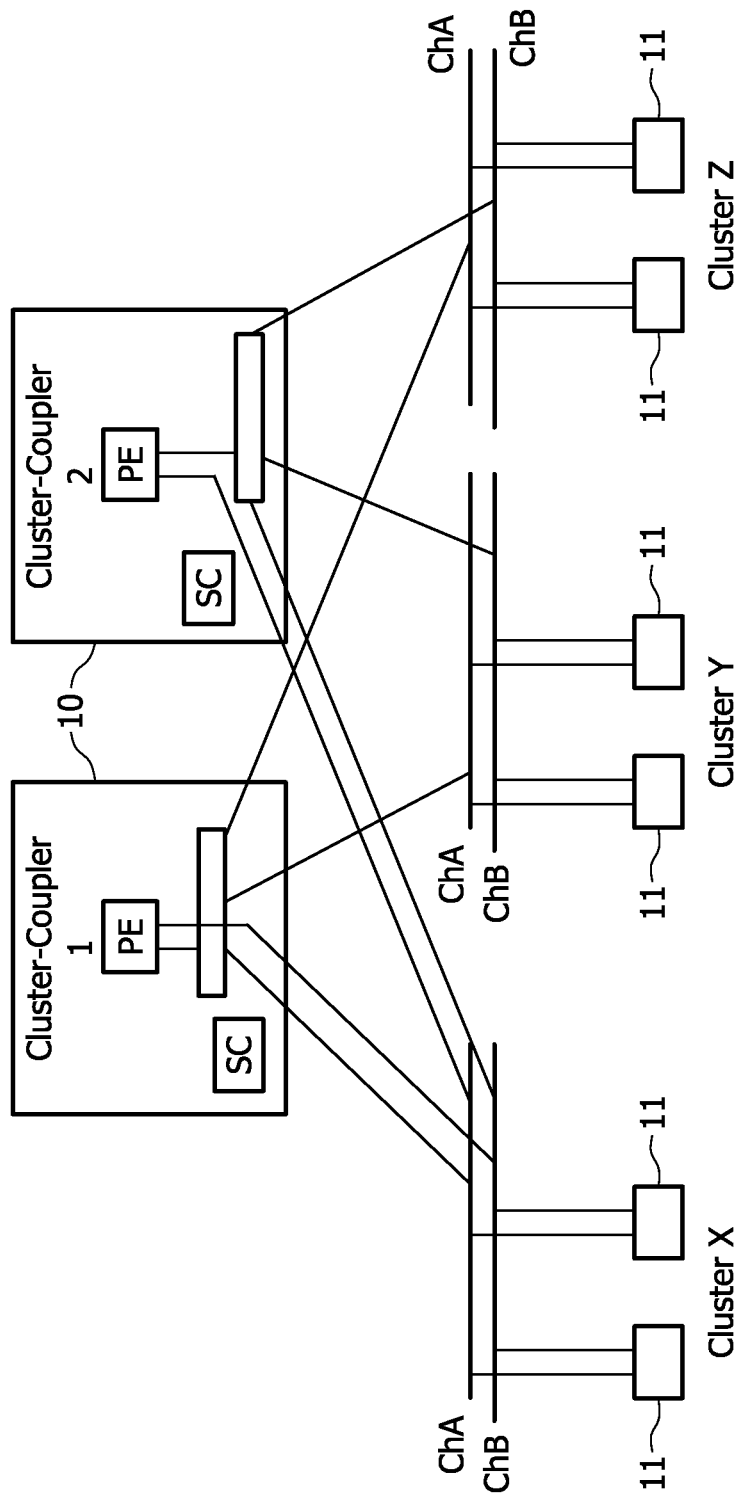
Figure 10:
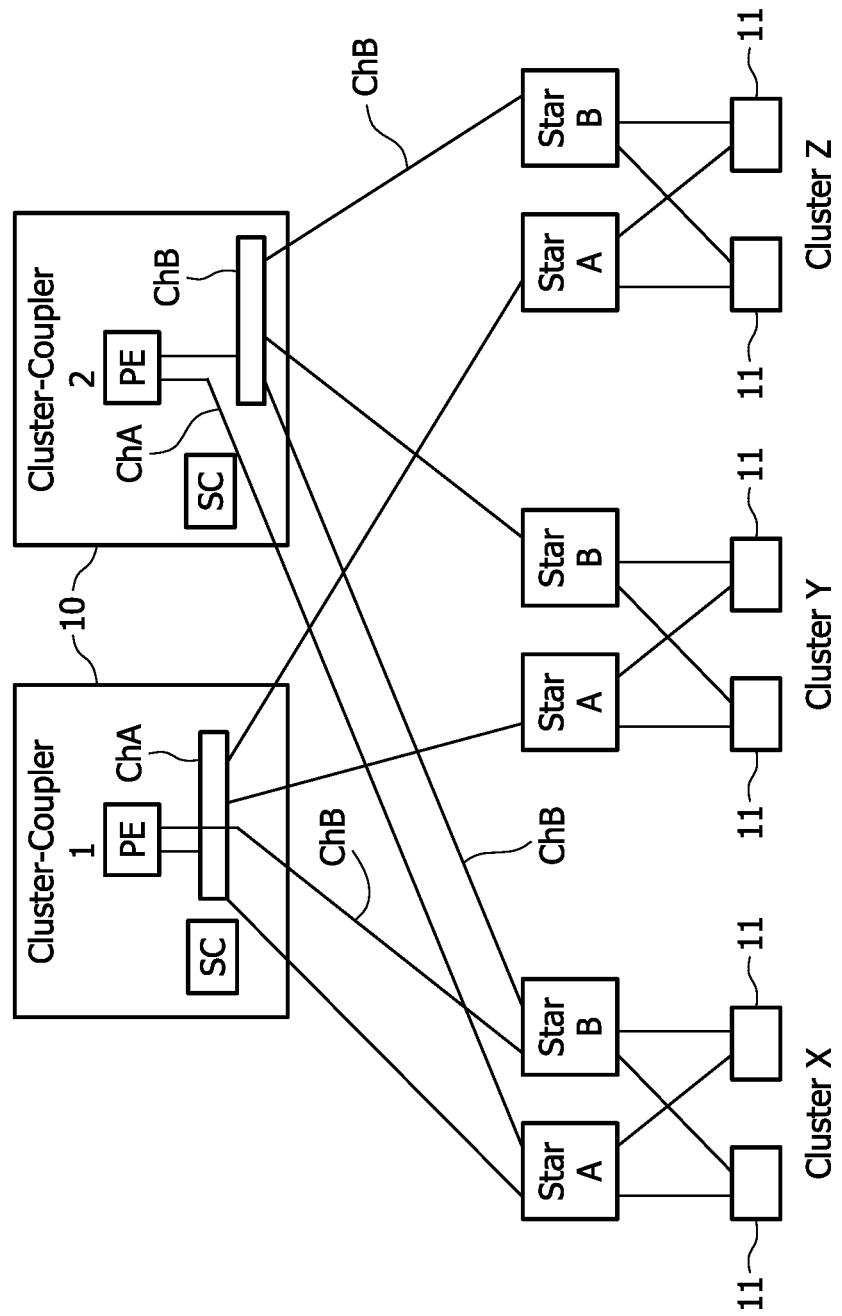
Figure 11:
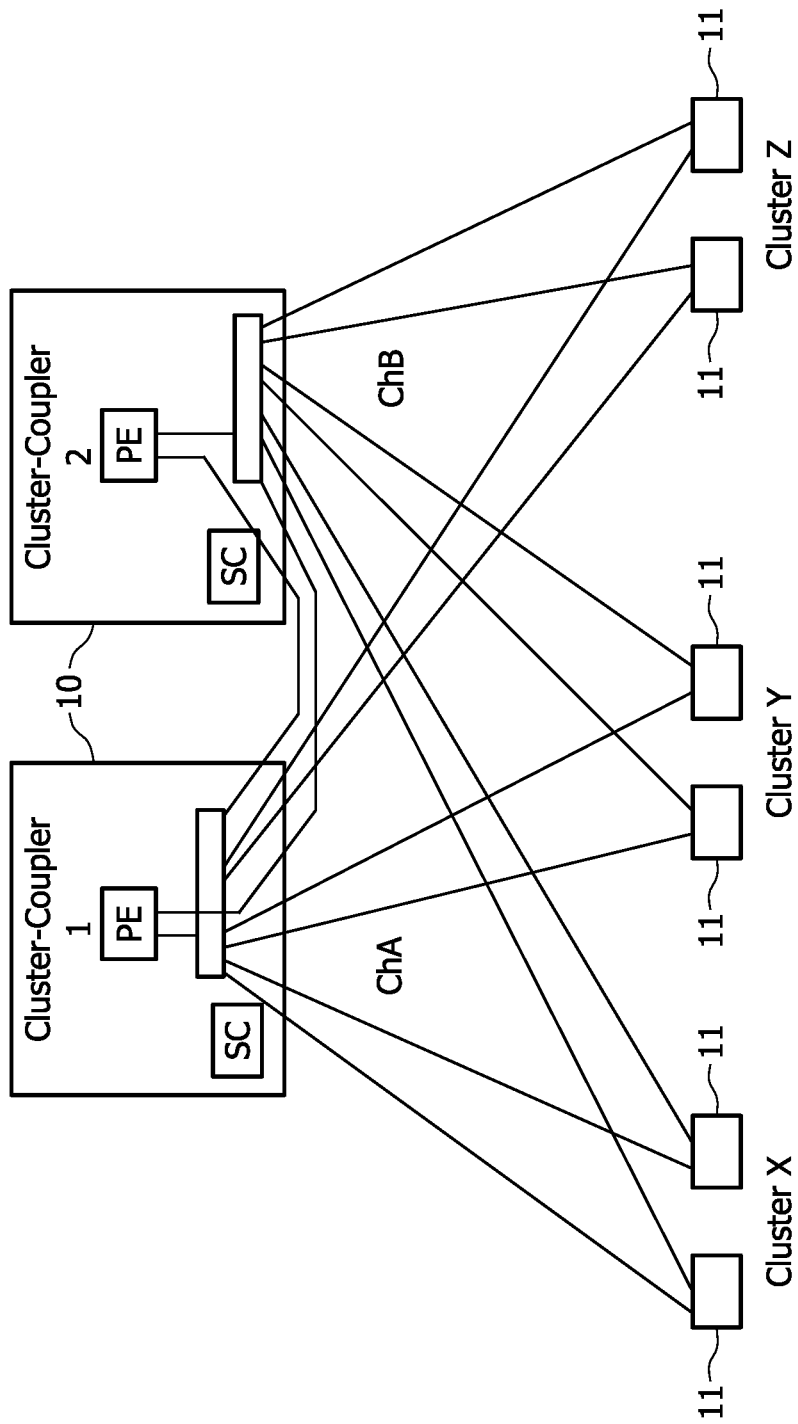

The invention is described in the detail below as referenced in the accompanying schematic drawings, wherein it is illustrated in:

FIG. 1a a network including a plurality of clusters;
FIG. 1b a schematic block diagram of a node;
FIG. 2 a configuration of a cluster coupler according to the invention;
FIG. 3 a cross-point matrix according to the invention;
FIG. 4a a configuration schedule for startup;
FIG. 4b a configuration matrix for a cluster coupler according to 4a;
FIG. 5 a cluster coupler according to another embodiment of the invention;
FIG. 6 a further embodiment of a cluster coupler according to the invention;
FIG. 7 an embodiment for connecting cluster couplers as shown in FIG. 6;
FIG. 8 a further embodiment for connecting cluster couplers as shown in FIG. 6;
FIG. 9 a further embodiment for connecting cluster couplers as shown in FIG. 7;
FIG. 10 a further embodiment for connecting cluster couplers as shown in FIG. 8;
FIG. 11 a further embodiment for connecting cluster couplers as shown in FIG. 7

FIG. 1 illustrates a network according to the invention. A cluster coupler 10 is connected to a plurality of clusters A, B, X. The clusters have various topologies. Cluster A has a passive bus construction. In cluster B the nodes (not illustrated) are coupled via an active star coupler, wherein the nodes are connected directly to the star coupler. In cluster X also an active star coupler is used for coupling the nodes, but in the construction of cluster X sub nets of nodes coupled via a passive bus are coupled to the star coupler. An active star coupler connecting the nodes in a cluster serves to improve the signal quality on the communication line, compared to the situation where nodes are connected via a passive bus. An active star coupler allows connecting more nodes in a single cluster than a passive bus. It further offers the possibility to disconnect malfunctioning nodes from the cluster in order to limit the propagation of faults through the cluster. A conventional star coupler works on physical level forwarding data from one selected input port to all output ports at a time. On protocol level, it does not show a difference between a bus and a star topology.

In general, no restriction is made in respect to the topology within a cluster. The sole restrictions or prerequisites are that the same time triggered protocol needs to be used within the clusters A, B, X. Further, the cycle length, time slot length and frame length need to be compatible to each other. Based on the requirements a synchronization between the clusters maybe realized.

With reference to FIG. 1b, a node 11 used in such cluster is described in more detail. A typical fault-tolerant time-triggered network consists of two or more communication channels ChA, ChB, to which nodes 11 are connected. Each of those nodes 11 consists of a bus driver 17, a communication controller 15 and eventually a bus guardian device 14 for each bus driver 17 and an application host 13. The communication controller 15 includes a protocol engine 12 and if a host 13 is connected a controller host interface (not illustrated). The bus driver 17 transmits the bits and bytes that the communication controller 15 provides onto its connected channels and in turn provides the communication controller 15 with the information it receives from the channel ChA, ChB. The communication controller 15 is connected to both channels and delivers relevant data to the host application 13 and receives data from it that it in turn assembles to frames and delivers to the bus driver 17. For this invention, the protocol engine contained by the communication controller 15 is of relevance. The bus driver 17, the bus guardian 14 and the host application 13 are basically only listed to provide a better overview, in which context the invention might be used. The invention is not limited or restricted by the presence or absence of those devices.

The communication controller 15 contains a so-called protocol engine 12, which provides a node 11 with the facilities for the layer-2 access protocol. Most relevant for this invention is the facility to access the medium with a pre-determined TDMA scheme or communication schedule. Each cluster has its own cluster schedule defining which node may transmit within which time slot. Additionally, each protocol engine includes a protocol engine schedule. The protocol engine schedule for each node 11 inside a cluster have to be configured such that no conflict between the nodes 11 occurs when transmitting data on the network. The bus guardian 14 is a device with an independent set of configuration data that enables the transmission on the bus only during those time slots, which are specified by the cluster schedule in the configuration set of the bus guardian. The application host 13 contains the data source and sink and is generally not concerned with the protocol activity. Only decisions that the communication controller 15 cannot do alone are made by the application host 13.

Synchronization between the nodes 11 is a pre-requisite to enable time-triggered TDMA based access to the network. Every node 11 has its own clock, for which the time base can differ from the other nodes 11, although they are originally intended to be equal, caused by temperature and voltage fluctuations and production tolerance.

The communication controller 15 includes a synchronization mechanism wherein nodes 11 listen to their attached channels and can adapt to, or influence a common clock rate and offset.

Network startup in a single cluster is handled by so called cold-starting nodes, wherein one initiates the communication cycles in a cluster and others respond. This node is selected either by configuration or by some algorithm, that determines which of several potential nodes performs the startup. This algorithm generally consists of transmitting frames or similar constructs over the attached channels, whenever no existing schedule could be detected. The communication controller 15 of a cold-starting node thereby has to listen to all attached channels and has to transmit its startup data on all attached potentially redundant channels at the same time. There is only one single control logic for the startup inside the communication controller 15 for all attached channels. Each node listens to its attached channels. If it receives specific frames or similar constructs indicating a startup it will adopt the timing scheme from the observed communication and integrate into the system.

A bus guardian (not illustrated) per cluster may be added to such a cluster coupler. The single nodes or sub-nets of the cluster are connected to the bus guardian. This bus guardian is preconfigured with information about its cluster schedule including which of its nodes may transmit data to the other nodes during which time slot of the communication schedule. The bus guardian can also contain logic to determine the cluster schedule from information received from its nodes. This normally is a protocol engine with reduced functionality in some respects and added functionality with respect to protecting against different types of faults (e.g. protection against illicit startup attempts from branches that cannot do so, protection against transmissions longer than anything possibly legal, etc.).

Referring to FIG. 2, a cluster coupler 10 according to the invention is illustrated. It is illustrates how the cluster coupler 10 is connected to several communication clusters A, B, X. The cluster coupler 10 includes one protocol engine 12 only, in the following PE. This PE 12 can be used for different purposes, e.g. to connect an application host or a router (not illustrated) to the different network clusters. The PE 12 and the clusters A, B, X are connected to a buffer-less switch 20, which also is known as cross connect or matrix switch 20. The PE 12 contains the normal protocol knowledge about startup, protocol engine schedule, media access, etc. The protocol engine schedule includes when to sent synchronization information to the switch control unit, when to sent the synchronization or startup data/frames. Additionally, it may include when to receive and to transmit data from and to a host application (if a host is connected) and to one or more clusters. The PE 12 has multiple inputs and outputs of which only two are depicted. The RxD pin represents the receive path while the TxD pin represents the transmit path. Generally, but not exclusively, both are serial interfaces toggling between a '0' and a '1' state. For the FlexRay protocol the transmit path has an additional 'enable' pin needed for attaching three-state physical layers (not illustrated). The switch 20 is primarily intended to selectively forward data between the PE 12 and the clusters A, B, X and between the clusters A, B, X, but can also be utilized to achieve the obligatory synchronization between the clusters A, B, X. The switch 20 is placed between the PE 12 and the clusters A, B, X and is provided to connect the PE 12 to the clusters and secondary the clusters to each other.

A switch control unit 21 configures the switch 20 based on the internal interconnection schedule and the startup/synchronization information received from the PE 12. The switch control unit 21 assures that the switch 20 transports the data according to the needs. The switch control unit 21 is responsible for the configuration of the switch 20 to determine which input ports of the switch 20 are connected to which output ports of the switch 20 at which point in time.

The switch 20 can be configured to exchange data between clusters. To perform its task the switch control unit 21 receives synchronization information from the PE 12, wherein the synchronization information include the timing of a slot and/or the timing of a cycle containing a pre-configured number of slots. Based on this timing information and its interconnection schedule, the switch control unit configures the switch.

The switch control unit 21 not only configures the switch 20, but can additionally also guard each bus driver (not illustrated) in the transmit path towards the cluster. Thus, a protection is easily achieved. In particular, the switch control unit 11 may control dependent on whether the cluster coupler is in a startup phase or in normal operation which kind of data is transferred from the PE to the cluster or between the clusters. During the startup phase the switch control unit 21 allows only a passing of startup and synchronization frames through the switch. Other data are blocked. During normal mode it may be necessary to block startup frames. However, synchronization frames should pass the switch.

The configuration of the switch 20 is changed during operation depending on the needs for forwarding the data. FIG. 2 shows the cluster coupler 10 connecting different clusters A-X. The interconnection schedule is stored in the switch control unit 21 determining the switch configuration for every communication time slot. The interconnection schedule determines which data is forwarded between the clusters A, B, X and also between the protocol engine 12 and the clusters A, B, X. The protocol engine 12 can be used e.g. to serve a host, but is primarily meant to realize the inter-cluster synchronization process and to provide the switch control unit 21 with timing information to assure that its interconnection schedule is aligned to the clusters. The protocol engine 21 is not assigned to a single cluster, but can communicate with multiple clusters A, B, X according to the interconnection schedule. The PE 12 could also be realized as an integral part of the switch control unit 21.

FIG. 3 illustrates a cross-point matrix switch 20 as used in the invention. The cross-point matrix is configured per output port as shown on the lower edge of the matrix. For each output port, a configuration register 31 determines to which input port it is connected. Writing a new input port number into the configuration register 31 changes the connection for the corresponding output port at the next time slot for which the timing is determined by a synchronization signal. The synchronization signal must effectuate the new configuration of the switch 20 during an idle time of the synchronized clusters A, B, X in between two time slots of the TDMA protocol.

The input ports and output ports of the cross-point matrix are connected to the appropriated protocol engine PE and cluster ports CL-A, CL-B, CL-X. The configuration interface 32 is connected to the switch control unit 21. The synchronization interface Sync can be connected to the switch control unit 21 or directly to the protocol engine 12, since the latter primarily provides the switch control unit 21 with the timing.

The configuration of the cross-point matrix can be changed for every time slot. By use of configuration matrix as shown in FIG. 4b a configuration of the cross-point matrix for a time slot is defined. FIG. 4a illustrates the interconnection schedule with four time slots at the beginning and a last one at the end of a cycle. It is not possible to transmit data from the input port to output port having the same number. Therefore the connection fields in the diagonal is hatched, respectively. The connection fields having the smaller rectangle indicate a connection between the input port of the respective row with the output port in the respective column of the cross point matrix in FIG. 4a. It could be easily seen, that in the first time slot input 3 is connected with output 0 and input 1 is connected with output 2. In the second time slot a connection is set between input 2 and output 1 and between input 0 and output 3. In the third time slot input 1 is connected output 0 and input 3 with output 2. In the fourth time slot input 0 is connected with output 1. The last time slot of cycle has connections between input 2 and output 0 and between input 1 and output 3.

A prerequisite for avoidance of frame buffering in the switch 20 is that the clusters need to be synchronized closely from the start. The facilities for this synchronization are offered by the switched cluster coupler 10 as well. To realize synchronization from the start, the protocol engine 12 in the cluster coupler 10 takes the lead during startup and indicates the exact start moment to the switch control unit 21. For initiating the start the protocol engine 12 receives a stimulus, e.g from a host application (not illustrated) or from the communication controller. The switch control unit 21 is triggered by the start of the protocol engine 12 of the cluster coupler 10 and configures the interconnection schedule such that startup and synchronization data generated by the protocol engine 12 and the response of the nodes 11 in the clusters A, B, X are distributed to all clusters.

A selected set of nodes 11 in the clusters A, B, X is configured to respond to the initiative of the protocol engine 12 of the cluster coupler 10. Each node 11 that participates in the startup phase should be configured such that it reacts to the initiative of the protocol engine 12 of the cluster coupler 11 in a time slot that is pre-allocated for its answer. The allocation of startup and synchronization information provided by the different nodes 11 occurs in different time slots to avoid conflicts when forwarding this data. The interconnection schedule of the switch control unit 21 is adapted to these pre-allocated time slots of each individual node 11 in order to forward the response of the selected nodes 11 to the protocol engine 12 in the cluster coupler 11 and to the other clusters B, X. Since the relevant startup and synchronization data are distributed to all clusters A, B, X from the start, all other nodes 11 can adjust their timing to the startup initiative. Any other data not related to the synchronization is not forwarded between the clusters A, B, X during startup. To prevent an un-coordinated startup of the clusters A, B, X, no node 11 than the cluster coupler 10 should take the initiative for the startup procedure.

FIG. 4b indicates an example of the switch configuration for two time slots. In one time slot startup information is distributed from the protocol engine 12 in the cluster coupler 10 to all clusters A, B, X. In the other time slot a response from a node 11 in cluster A is forwarded to the protocol engine 12 in the cluster coupler 10 and to the other clusters B, X.

In the following the normal operation of the cluster coupler 10 will be described in more detail. During normal operation the switch control unit 21 configures the switch 20 according to its interconnection schedule and allows for the communication of normal data in addition to synchronization data. The time slot allocation in the cluster schedule of normal data transmission by the different nodes 11 inside a cluster A, B, X is primarily avoiding any conflicts in the medium access. This is a basic assumption for TDMA in a shared medium. Secondary the time slot allocation in the interconnection schedule is also avoiding conflicts in data forwarded from one cluster A to another cluster B. This means that if the interconnection schedule of the switch control unit 21 forwards data on a certain time slot to a number of clusters B, X, no other node 11 in these clusters B, X is transmitting in this time slot.

The inventive cluster coupler 11 maybe also used for protecting the traffic from any faults occurring within the clusters A, B, X. With reference to FIG. 5 the protection will be explained in more detail. Since the switch 20 only forwards data according to the interconnection schedule, it automatically gives a fault propagation protection. If a node 11 in a cluster A, B, X tries to access the medium at a wrong time slot, meaning outside a time slot assigned for forwarding data for this cluster, the switch 20 will block the respective data. To guard the protocol engine 12 of the cluster coupler 11, the switch control unit 21 may additionally be provided with its own timing source (indicated with the dotted lines to the busses), thereby synchronizing itself to the received data from the clusters A, B, X. During startup however, the timing of the protocol engine 12 is followed to correctly forward its startup and synchronization data.

In the previous figures, the cluster coupler 10 is connected to a single channel for each cluster A, B, X. The invention is however not restricted to single channel systems. Multiple channels ChA, ChB per cluster A, B, X can be supported. If the cluster coupler 10 is connected to multiple channels ChA, ChB and each channel ChA, ChB in a cluster A, B, X is enumerated by an index (e.g. channel 1, 2, ... x), a separate switch 20 inside the cluster coupler 11 connects each set of channels ChA, ChB with the same index to each other and to the protocol engine 12 inside the cluster coupler. Such realization is depicted in FIG. 6 showing an example of a cluster coupler 10 connecting clusters A-X with dual channels ChA, ChB.

Further the inventive cluster coupler 10 maybe also used to increase the redundancy of a network. To prevent a single point of failure of the cluster coupler 11, it is preferred that multiple cluster couplers 10 connect the clusters A, X, B. In this case these cluster couplers 10 share at least one channel ChA, ChB in one of the clusters to be able to synchronize to each other. The cluster couplers 10 preferably share multiple channels ChA, ChB to provide redundant inter-cluster synchronization.

If two, or more cluster couplers 10 are redundantly present, other nodes 11 in the clusters are not needed for the startup procedure. In this case, it is even not preferred that other nodes participate in the startup procedure to prevent inconsistency of startup procedure. Each of the switch control units 21 in the multiple cluster couplers 10 configure the switch 20 such that it forwards the startup and synchronization data between the local protocol engine 12 and the other cluster couplers. This can for example be realized by exchanging startup and synchronization information at one cluster shared by all cluster couplers. In this case each switch control unit 21 configures the switch 20 such that it distributes its initiative for startup to all clusters and then listens to the response on the shared cluster from the other nodes allowed to participate on the shared cluster. If more then one cluster coupler tries to take the initiative, a standard collision resolution protocol maybe applied to decide which cluster coupler will take the lead and should be followed for synchronization.

In normal operation the TDMA interconnection schedules of two or more cluster couplers should differ for the forwarding of data. One possibility is to let one of the cluster couplers forward all data that need to be forwarded and let the other cluster couplers be on hot standby. Another possibility is to let each cluster coupler forward only a part of the received data. It is hereby assumed that a conventional node 11 is able to transmit redundant data, by transmitting it on multiple channels ChA, ChB and/or by transmitting it in multiple time slots in the same channel.

An example of redundant cluster couplers connecting clusters X, Y and Z is shown in FIGS. 7 and 8. Two redundant cluster couplers: cluster coupler 1 and cluster coupler 2 connect the clusters X, Y and Z, each having two channels ChA and ChB. The connection of the nodes 11 in a channel ChA, ChB is realized with passive bus as shown in FIG. 7 or with an active star as illustrated in FIG. 8. Naturally, clusters X, Y and Z can also be implemented using different topologies. Even the channels ChA and ChB within one cluster need not have the same topology, meaning that channel ChA can be realized as a passive sub-bus, while channel ChB has an active star. Hybrid technologies are also possible. The invention does not limit the available topologies of the underlying protocol.

One option is that cluster coupler 1 forwards data between channel A of cluster X and channel ChA of cluster Y and ditto for channels ChB of cluster X and cluster Y. Coupler 2 is hot standby and configured identical to cluster coupler 1.

A second option is that cluster coupler 1 forwards part of the data between channel ChA of cluster X and channel ChA of cluster Y and cluster coupler 2 forwards the other part of the data between channel ChA of cluster X and channel ChA of cluster cluster Y, ditto for channels ChB of cluster X and Y.

A third option is that cluster coupler 1 forwards data between channel ChA of cluster X and channel ChA of cluster Y and cluster coupler 2 forwards data between channel ChB of cluster X and channel ChB of cluster Y.

The third option allows for an optimization of the network topology and reduction of cost. Cluster coupler 1 does not need to be connected to channels ChB of cluster X and of cluster Y; Also, cluster coupler 2 does not need to be connected to channel ChA of cluster X and of cluster Y. However because both cluster couplers 1, 2 must synchronize to each other they must have a common channel. FIGS. 9 and 10 show an optimization of the networks as shown in FIGS. 7 and 8, respectively, wherein both cluster couplers 1, 2 synchronize to each other via cluster X. Because the protocol engine 12 in each of the cluster couplers 1, 2 is directly connected to cluster X for synchronization purposes, a single cross matrix switch 20 in the cluster coupler will be sufficient. The protocol engine 12 of cluster coupler 1 can be directly connected to channel ChB, meaning that a single switch 20 serving channel A will be sufficient and the protocol engine 12 of cluster coupler 2 can be directly connected to channel ChA, meaning that a single switch 20 serving channel B will be sufficient.

The cluster coupler can also be utilized to connect the individual nodes 11 directly. It thereby can make the conventional star couplers within the clusters superfluous. FIG. 11 shows an optimized network topology that in comparison to FIG. 10 does not use conventional star couplers, but still provides point-to-point connections to all nodes 11. The cluster couplers in FIG. 11 are used both for inter-cluster and for intra-cluster communication. However because both cluster couplers 1, 2 must synchronize to each other, they need to share channels and therefore two redundant channels connect the cluster couplers directly.

By providing a cluster coupler having a switch which is controlled based on an interconnection schedule and synchronization information received from only one protocol engine for the connected clusters it is possible to forward data on a time slot basis between connected clusters and between the protocol engine of the cluster coupler without needing any buffer for storing the data. Additionally, the fault protection between the clusters is increased and the synchronization of the clusters maybe realized very easy by use of the intelligent switch without imposing any delay during forwarding the data.

The invention claimed is:
1. Cluster coupler in a network operating on a time triggered protocol using time slots, wherein the cluster coupler is coupled to at least two clusters, each cluster includes at least two nodes and a cluster schedule defining a time slot in which each node of the cluster may transmit, wherein the same protocol is used within the clusters, the cluster coupler comprises:
- a switch having an input port and an output port for each of the at least two clusters;
- a switch control unit, including an interconnection schedule indicating which input port of the switch is connected to which output port of the switch at a predetermined time slot; and
- a protocol engine configured and arranged to:
  - synchronize the cluster schedule of each cluster with the interconnection schedule by causing distribution of startup or synchronization data to all the clusters and communicate data to and from each cluster via the input and output ports to which the cluster is connected, based upon the interconnection schedule and the startup or synchronization data.

2. Cluster coupler as claimed in claim 1, wherein the protocol engine is configured to
- monitor traffic to the clusters,
- derive a timing schedule based upon the monitored clusters, and
- communicate with the connected clusters according to the derived timing schedule and the interconnection schedule of the switch.

3. Cluster coupler as claimed in claim 1, wherein protocol engine is integrated in the switch control unit and the switch control unit is configured to route data between the clusters by connecting input ports to output ports by synchronizing a timing schedule of the clusters with the interconnection schedule.

4. Cluster coupler as claimed in claim 1, wherein the protocol engine is configured to initiate a synchronized startup of the connected cluster by providing startup information to the switch control unit for controlling the switch in such a way that startup/synchronization data generated by the protocol engine and responses of the nodes in the clusters are distributed to all clusters.

5. Cluster coupler as claimed in claim 1, wherein the protocol engine is configured to maintain synchronization of connected clusters after startup by providing synchronization information to the switch control unit for controlling the switch in such a way that synchronization data generated by the protocol engine and by the nodes in the clusters are distributed to all clusters.

6. Cluster coupler as claimed in claim 1, wherein the switch is configured to forward data between clusters and the protocol engine and forwarding data between the clusters.

7. Cluster coupler as claimed in claim 1, wherein the switch includes a plurality of input ports and output ports in matrix form, wherein a configuration register is assigned to each output port for determining to which input port the output port is connected.

8. Cluster coupler in a network operating on a time triggered protocol using time slots, wherein the cluster coupler is coupled to at least two clusters, a cluster includes at least one node, wherein the same protocol is used within the clusters, the cluster coupler comprises:
- a protocol engine, a switch and a switch control unit, wherein the switch control unit includes an interconnection schedule indicating which input port of the switch is connected to which output port of the switch at a predetermined time slot, and wherein the protocol engine is configured to cause distribution of startup or synchronization data to all the clusters, and wherein the protocol engine includes a protocol engine schedule defining at which time slots synchronization data needs to be sent to the clusters and at which time slots the protocol engine is outputting synchronization information to the switch control unit for indicating to the switch control unit when the input ports and output ports of the switch needs to be connected to distribute the synchronization data to all clusters simultaneously.

9. Cluster coupler as claimed in claim 1, wherein the switch control unit is guarding the connected clusters, the protocol engine and single nodes connected to the cluster coupler by connecting the input ports and output ports of the switch depending on its interconnection schedule.

10. Cluster coupler as claimed in claim 1, wherein when a cluster comprises a plurality of channels, the cluster coupler includes a plurality of switches, wherein each of the switches is connected to one channel.

11. Network having a plurality of clusters, wherein each cluster includes a plurality of nodes, the clusters operate on the same time triggered protocol and are connected via a cluster coupler as claimed in claim 1.

12. Network as claimed in claim 11, wherein a plurality of cluster couplers is provided, wherein each of the cluster couplers may be connected to each cluster of the network.

13. The cluster coupler of claim 1, wherein the protocol engine and switch control unit are configured and arranged to communicate data, for a particular one of the clusters, by
- communicating data to the cluster from another cluster via the switch, and
- communicating data from the cluster to another cluster via the switch.

14. A method for communicating in a network having at least two clusters using a time triggered protocol on time slot basis and a cluster coupler having a switch having a plurality of input ports and output ports, the method comprising:
- providing synchronization between the connected clusters at start up and during operation by synchronizing a cluster schedule of each cluster with a switch interconnection schedule using the protocol engine in the cluster coupler,
- where each cluster includes at least two nodes and each cluster schedule defines a time slot in which each node of the cluster may transmit;
- providing synchronization information to the switch control unit for configuring the switch on a global time slot base; and
- at the switch control unit, connecting the input ports to the output ports based upon the synchronization information and the switch interconnection schedule, the switch interconnection schedule comprising a switch interconnection configuration for each time slot for connecting input ports to output ports in the switch.

15. The method of claim 14, wherein providing synchronization information includes monitoring the clusters and providing the synchronization information in response to the monitoring.

16. The method coupler circuit of claim 14, wherein connecting the input ports to the output ports includes, for at least one of the clusters,
- communicating data to the cluster from another cluster via the switch, and
- communicating data from the cluster to another cluster via the switch.

17. For use in a network operating on a time triggered protocol using time slots and having a plurality of clusters that communicate on a common protocol, each cluster having a cluster schedule defining a time slot in which each node of the cluster may transmit, a cluster coupler circuit comprising:

a plurality of input ports and output ports connected to at least two of the clusters, where each cluster includes at least two nodes;

a protocol engine configured and arranged to derive timing synchronization data based upon data traffic at the clusters;

a switch; and a switch control unit configured and arranged to control the switch for connecting the input and output ports at a predetermined time slot based upon an interconnection schedule and the timing synchronization data derived by the protocol engine, and wherein the protocol engine is configured and arranged to synchronize the cluster schedule of each cluster with the interconnection schedule by causing distribution of startup or synchronization data to all the clusters.

18. The circuit of claim 17, wherein the protocol engine is configured to monitor the clusters to derive the timing synchronization data, and the switch control unit is configured to synchronize the clusters to each other at startup, and to synchronize the clusters to each other during operation based upon the timing synchronization data and the interconnection schedule.

19. The circuit of claim 17, wherein the protocol engine is configured to monitor each cluster to derive a timing synchronization schedule for each cluster, each cluster being configured to operate using a common cycle length, time slot length and frame length, and the switch control unit is configured to synchronize the respective timing synchronization schedules with the interconnection schedule to control the connection of the input ports to the output ports for routing data to the clusters.

20. The cluster coupler circuit of claim 17, wherein the protocol engine is configured to facilitate synchronization of connected clusters by providing synchronization information to the switch control unit for controlling the switch to distribute synchronization data generated by the protocol engine and by nodes in the clusters are distributed to all clusters.

* * * * *